(12) United States Patent
Feng et al.

(10) Patent No.: US 9,029,807 B1
(45) Date of Patent: May 12, 2015

(54) HYBRID SCINTILLATORS FOR NEUTRON DISCRIMINATION

(71) Applicant: Sandia Corporation, Albuquerque, NM (US)

(72) Inventors: Patrick L. Feng, Livermore, CA (US); Joseph G. Cordaro, Oakland, CA (US); Mitchell R. Anstey, Oakland, CA (US); Alfredo M. Morales, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 140 days.

(21) Appl. No.: 13/834,227

(22) Filed: Mar. 15, 2013

(51) Int. Cl.
*C09K 11/06* (2006.01)
*G01T 1/204* (2006.01)

(52) U.S. Cl.
CPC ............ *C09K 11/06* (2013.01); *G01T 1/204* (2013.01)

(58) Field of Classification Search
CPC ....... C09K 11/06; G01T 1/2042; G01T 1/204
See application file for complete search history.

(56) References Cited

U.S. PATENT DOCUMENTS

| | | | |
|---|---|---|---|
| 4,271,035 A | 6/1981 | Saito et al. | |
| 5,410,155 A * | 4/1995 | Thomson et al. | 250/364 |
| 2010/0101983 A1 * | 4/2010 | Butler et al. | 209/552 |
| 2011/0095231 A1 * | 4/2011 | Dai et al. | 252/301.17 |
| 2011/0108738 A1 | 5/2011 | Doty et al. | |
| 2014/0145094 A1 * | 5/2014 | Boday et al. | 250/459.1 |

FOREIGN PATENT DOCUMENTS

| | | |
|---|---|---|
| EP | 0114941 | 8/1984 |
| EP | 1555546 | 7/2005 |
| GB | 1222111 | * 9/2014 |

OTHER PUBLICATIONS

Horrocks, D. L., "Pulse shape discrimination with organic liquid scintillator solutions", Applied Spectroscopy, vol. 24, No. 4, (1970), 397-404.

Winn, D. R., et al., "Water-based scintillators for large-scale liquid calorimetry", IEEE Transactions on Nuclear Science, vol. NS-32, No. 1, (Feb. 1985), 727-732.

Yeh, M., et al., "A new water-based liquid scintillator and potential applications", Nuclear Instruments and Methods in Physics Research A, 660, (2011), 51-56.

* cited by examiner

*Primary Examiner* — Yara B Green
(74) *Attorney, Agent, or Firm* — Medley, Behrens & Lewis, LLC

(57) ABSTRACT

A composition capable of producing a unique scintillation response to neutrons and gamma rays, comprising (i) at least one surfactant; (ii) a polar hydrogen-bonding solvent; and (iii) at least one luminophore. A method including combining at least one surfactant, a polar hydrogen-bonding solvent and at least one luminophore in a scintillation cell under vacuum or an inert atmosphere.

20 Claims, 4 Drawing Sheets ately, liquid scintillation cocktails have been developed for the detection of tritium or charged particles in environmental test samples. Liquid scintillation counting is applied by adding a radioactive sample to a scintillation cocktail and monitoring the generated luminescence. Such materials generally employ surfactants or extracting agents to achieve phase compatibility with aqueous test samples. Alpha/beta pulse shape discrimination has been reported in several types of liquid scintillation cocktails. The method for alpha/beta discrimination is analogous to neutron/gamma PSD. Alpha/beta misclassification ratios of between 0.5 percent and 1.0 percent have been reported for discrimination of 5.5 MeV alpha particles and 710 keV beta particles in liquid scintillation cocktails. This level of discrimination efficiency is, in general, insufficient for passive detection applications such as screening at point-of-entry crossings.

HYBRID SCINTILLATORS FOR NEUTRON DISCRIMINATION

STATEMENT OF GOVERNMENT RIGHTS

This invention was developed under Contract DE-AC04-94AL85000 between Sandia Corporation and the U.S. Department of Energy. The U.S. Government has certain rights in this invention.

FIELD

Scintillators.

BACKGROUND

Scintillators have found widespread usage for the detection of neutron radiation, as emitted by many radioactive sources. Scintillation occurs due to the recombination of ionized electrons and molecular ions that are generated within a luminescent material. Two types of excited molecular states may be populated upon ionization recombination in organic scintillators, termed singlet and triplet states. Singlet excited states may freely relax to the ground state through a spin-allowed fluorescence transition that occurs on the order of nanoseconds. Triplet states, which account for 75 percent of the excited states generated by ionizing radiation interaction, may not relax freely to the ground state due to the spin-forbidden nature of this transition. Accordingly, the triplet states do not generate significant luminescence in organic scintillators due to very long luminescence lifetimes (on the order of milliseconds or longer) and low emission quantum yields. In some organic scintillating materials, delayed singlet luminescence may be observed. Delayed singlet luminescence occurs as the result of the fusion of two excited triplet excited states, which results in the production of one excited singlet and one ground singlet state. The singlet excited state rapidly decays via a delayed fluorescence mechanism, with the rate-determining step being the kinetics of triplet diffusion. Typically, only a small fraction (such as two percent) of excited electrons in triplet states may undergo this recombination and relaxation process to produce luminescence. This is due to a combination of finite triplet mobility rates and lifetimes, trapping effects, and quenching by impurities such as aromatic ketones or triplet species such as molecular oxygen. Consequently, effective materials for particle discrimination include liquid and solid organic materials that possess sufficiently large triplet mobility rates and delayed fluorescence intensities.

The prompt fluorescence response and slower delayed fluorescence response described above may be exploited in scintillator systems to discriminate between ionizing particles, including discrimination between fast neutrons and gamma ray photons. These neutral particles are converted to charged particles by interaction with the scintillation material. Elastic collisions of fast neutrons with hydrogen atoms in the scintillating material generate recoil protons, whereas interactions with gamma rays produce scattered electrons, as understood in the art. Particle discrimination is possible because the intensity of prompt scintillation is dependent upon the energy deposited per unit length in the material (dE/dX), which is lesser for electrons than protons. By contrast, the delayed scintillation response is generally less dependent upon the type of ionizing particle. This effect may be used to differentiate signals from different particle types using a technique referred to as pulse-shape discrimination (PSD).

Standard formulations for liquid scintillators comprise fluorescent solutes dissolved in aromatic organic solvents such as benzene, toluene, xylenes, and 1,2,4-trimethylbenzene. Such solvents generally possess high vapor pressures and are rated as highly flammable, flammable, or combustible. Existing solvents used in liquid scintillators possess hydrogen-to-carbon ratios of close to one, which determines the cross section for elastic proton recoil following fast neutron interaction. (Benzene has a proton density of $4.1 \cdot 10^{22}$ atoms/cm$^3$). Another property of aromatic-based liquid scintillators is a nonzero solvent absorption coefficient in the UV-Visible region, which leads to optical attenuation lengths of less than five meters at a wavelength of 420 nm.

Alternative liquid scintillator formulations have been developed to avoid these derogatory effects. In particular, mineral oil-based scintillators possess reduced volatility and flash points, but have shorter optical attenuation lengths that degrade performance in large-scale applications. The commercial liquid scintillator EJ-309 produced by Eljen Technology has been reported to have an optical attenuation length on the order of one meter, as measured at 420 nm.

Separ

SUMMARY

A composition of an amphiphilic liquid or gel scintillator and a method for making an amphiphilic liquid or gel scintillator for ionizing particle detection are disclosed. A cell including a scintillator composition and a method of using a scintillator composition are also disclosed. In one embodiment, a scintillator composition of a solution includes (a) at least one surfactant; (b) a polar hydrogen; and (c) at least one lumiphore to enhance an energy transfer efficiency. A representative composition includes (a) one or a mixture of nonionic and ionic surfactants; (b) a polar-hydrogen-bonding solvent of water; (c) a primary lumiphore of an organic additive that enhances the energy transfer efficiency from surfactant matrix molecules; and (d) a secondary lumiphore of an organic additive that shifts the luminescence wavelength and increases the scintillation efficiency. A selection and concentration of a surfactant or combinations of surfactants, in one embodiment, is to achieve miscibility with the polar hydrogen-bonding solvent (e.g., water) while stabilizing domains of organic scintillating luminophores. The presence of stable lipophilic domains within these materials enables intermolecular energy transfer and triplet-triplet annihilation, which are requirements for high scintillation efficiency and PSD. A surfactant or combination of surfactants confer a desirable long optical attenuation length of water to the scintillator system, minimize the quenching and interfering effects of water, as well as incorporate a high density of hydrogen atoms within the scintillator. In one embodiment, a scintillation composition includes purified component materials and deoxygenated mixtures to reduce a potential for interfering effects from chemical and oxygen quenching, respectively. A representative use of a scintillation composition is one that provides neutron/gamma pulse-shape discrimination (PSD) to be performed.

DETAILED DESCRIPTION

Figure 1:
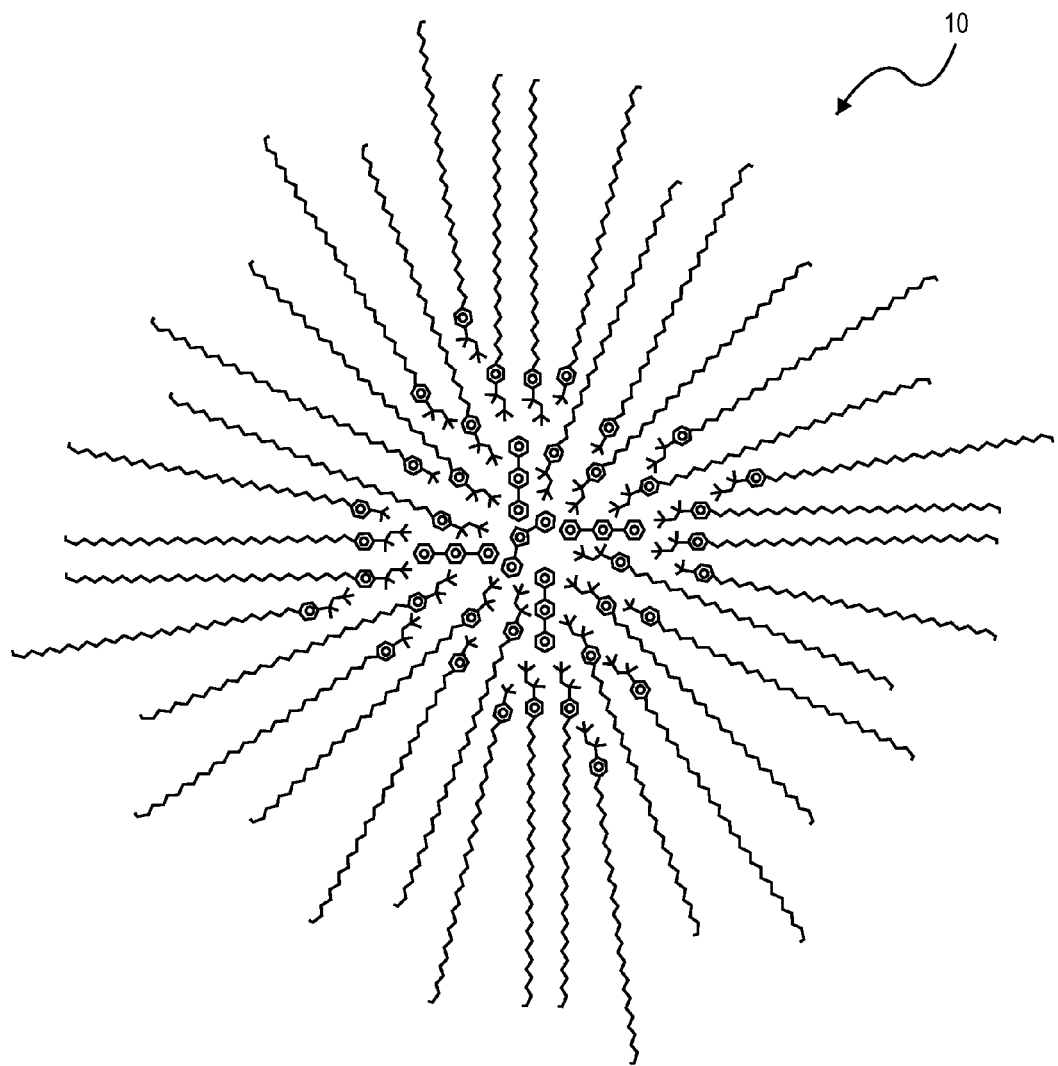
FIG. 1 shows a representative structure of an amphiphilic liquid scintillation composition based on micelles formed from the nonionic surfactant Triton X-100.

In one embodiment, a scintillation composition includes an amphiphilic matrix. The amphiphilic matrix may contain one or a mixture of suitable surfactants as a primary solvent. A representative amount of a surfactant or surfactants as a primary solvent is at a concentration range of 40 percent to 95 percent of a solution ($ w/w). Any of a variety of aromatic and non-aromatic organic compounds may be used as matrix components. The surfactant or surfactants are selected on their ability to form micelles, inverse micelles, or entangled network structures in a scintillation solution or viscoelastic gel. The specific nature of these domains is controlled by the chemical identify of surfactant(s) and the relative concentrations of organic and aqueous components. Generally, micelles are formed in mixtures that have a surfactant concentration greater than the critical micellar concentration (CMC) but less than the micelle inversion point. Inverse micelles may form for surfactant concentrations above the inversion point. Generally, for a surfactant or surfactants as the primary solvent, such surfactant or surfactants are selected based on the hydrophobicity of the lipophilic regions (e.g., higher hydrophobicity preferred over lower hydrophobicity) and corresponding domain sizes (e.g., generally on the order of 5 nanometers (nm) or greater). Single-component or mixtures of nonionic and ionic surfactants can be used to modify the size and increase the stability of formed micellar structures. Examples of nonionic surfactants include, but are not limited to, compounds in the family of polyethylene glycol ethers such as polyethylene glycol tert-octylphenyl ether (TRITON X-100) or polyethylene glycol oleyl ether (BRIJ 93). Examples of cationic surfactants include, but are not limited to, molecules belonging to families of compounds that include halide, hexafluorophosphate, tetrafluoroborate, and tetraphenylborate salts of alkylammonium, benzalkonium, and benzethonium cations. Examples of anionic surfactants include, but are not limited to, molecules that include alkali, ammonium, or alkylammonium salts of dodecylbenzenesulfonate, dodecylsufate, laureth sulfate, or stearate anions.

In one embodiment, scintillator compositions include mixtures that contain aromatic groups at the hydrophobic end of the surfactant molecule(s). Aromatic groups increase the energy transfer efficiency from the amphiphilic matrix to scintillating luminophores. In one embodiment, a liquid scintillation mixture based upon the nonionic surfactant Triton TRITON X-100 and the ionic surfactant sodium dodecylsulfate exhibits mixed micelles that are more stable than either of the individual constituents. This is evidenced by lower critical micellar concentrations (CMC) higher cloud points, and more dehydrated structures for the hydrophobic micellar cores. Thus, in one embodiment, a composition that encompasses the formation of stable micelles to maintain sufficient energy-transfer and triplet mobility for efficient scintillation and pulse-shape discrimination, respectively, is envisioned. Such properties may be determined by luminescence measurements such as monomer: excimer ratios in pyrene probe molecules, dynamic light scattering studies, and through direct scintillation measurements. Measurements on examples indicate relationships between the degree of micellary hydrophobicity and phase stability with the efficiency of PSD. In a related embodiment, a liquid scintillation mixture based upon the nonionic surfactant TRITON X-100 and the ionic surfactant sodium dodecylsulfate exhibits inverse micelles that are more stable than in either of the individual constituents. Inverse micelles are formed in mixtures of these surfactants that contain lesser amounts of water, between zero percent and 20 percent by weight.

In one embodiment, a scintillation composition includes a polar, hydrogen-bonding solvent as a secondary solvent. Representative polar, hydrogen-bonding solvents include, but are not limited to, water, methanol, 2-phenoxyethanol, phenylethanol, diphenylmethanol and diphenylether. A polar hydrogen-bonding solvent such as water in a scintillation composition provides additional protons for neutron interaction and generally good optical properties. However, polar, hydrogen-bonding solvents like water or methanol can quench luminescence. In the composition described, micelles, inverse micelles, or network structures created by the primary solvent (surfactant) will tend to exclude and inhibit quenching of luminescence. A representative amount of water in a composition is up to 40 percent w/w. In one embodiment, water is present in an amount of 0 percent to 40 percent. The use of water as a secondary solvent reduces or eliminates the flammability or combustibility of the scintillation composition. Water also enhances the hydrogen content of the scintillator. Water further allows use of the scintillation composition in passive applications where the scintillation composition is exposed to radiation passively such as by the location of the scintillation composition in an environment that may contain ionizing radiation. This is in contrast to active applications where the radiation is introduced directly to the scintillation composition, such as by the radiation being introduced into a tester (e.g., liquid scintillation counting). Water still further allows a scintillation composition to be prepared on site. In this manner, the individual components of a scintillation composition can be brought to a site and mixed in a cell with water that is available at the site.

In one embodiment, a scintillation composition includes one or more luminophores. Representatively, a scintillation composition suitable for PSD may include a primary lumiphore and a secondary lumiphore. A representative primary lumiphore molecule is a molecule including one or more aromatic groups having a Π electron system of lower energy than the surfactant. Examples of primary luminophores include, but are not limited to, p-terphenyl; 2,5-diphenyloxazole; 2-(4-tert-Butylphenyl)-5-(4-phenylphenyl)-1,3,4-oxadiazole; and diisopropyl phenyl.

A representative secondary lumiphore molecule is a molecule that is capable of allowing energy transfer from the primary lumiphore molecule. Examples of secondary luminophores include, but are not limited to, 1,4-bis(2-methylstyrl)benzene; 1,4-bis(5-phenyloxazol-2-yl)benzene; 2-(4-Biphenylyl)-6-phenylbenzoxazole; 9,10- diphenylanthracene; and 1,4-bis[2-(2-methylphenyl) ethenyl}-benzene ("bis-MSB").

A representative composition including a single surfactant as a primary solvent includes:

| | Component Weight Percent (% w/w) |
|---|---|
| Nonionic glycol surfactant: | 40 to 80 |
| Water: | 10 to 40 |
| Primary luminophore molecule: | 10 to 20 |
| Secondary luminophore molecule: | less than 2 |

A representative nonionic surfactant is a glycol surfactant having at least one aromatic group, such as TRITON X-100, commercially available from Sigma Aldrich Co. LLC. Surfactants having aromatic groups contain a Π electron system of relatively high energy. FIG. 1 shows a representative structure of amphiphilic liquid scintillation composition based on the nonionic surfactant TRITON X-100. FIG. 1 shows the primary and secondary luminophores stabilized within the hydrophobic core of micellar structure 10.

In one embodiment, a scintillation composition is formed by combining the fluorophores with the surfactant followed by the introduction of the polar hydrogen-bonding solvent (e.g., water) and stirring.

Figure 2:
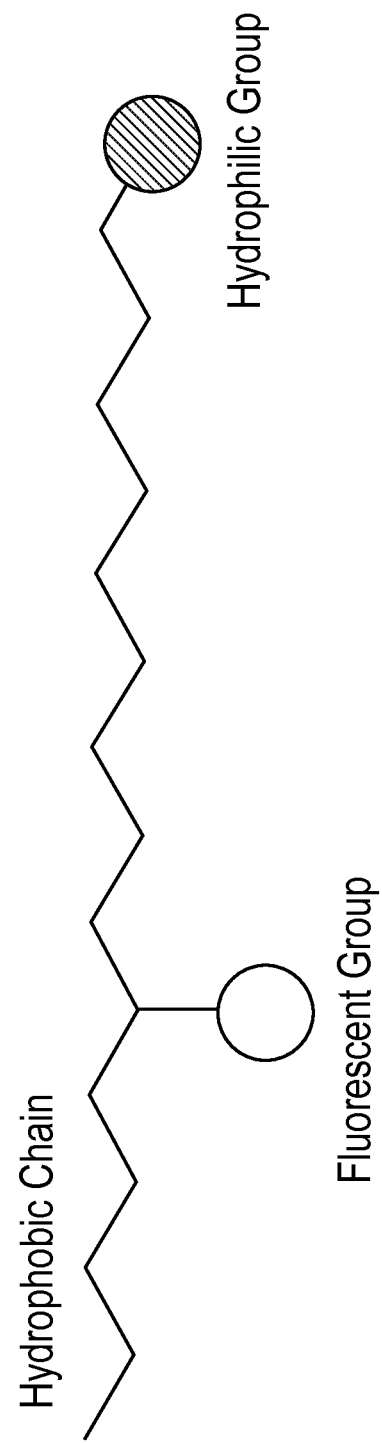
FIG. 2 shows a representation of a lumiphore conjugated with a surfactant or surfactant-like molecule or moiety.

Fluorescent surfactants may also be used, comprising structures schematized by FIG. 2. The hydrophobic chain may be linear or branched alkyl or aryl groups, whereas the hydrophilic group may be nonionic or ionic in composition. Nonionic polyethylene oxide chains of varying lengths may be used to modify the physicochemical properties of the mixture, including viscosity, miscibility profile, and domain size. Alternatively, hydrophilic ionic groups may be used, including alkylammonium, sulfonate, or phosphate substituents. The fluorescent group in FIG. 2 is a high quantum-yield fluorescent molecule that includes but is not limited to the examples of primary and secondary luminophores provided above. Other examples of high quantum-yield luminophores include functionalized 1-benzopyran-2-one dyes (Coumarins) or fluorescein derivatives.

Ionic species may be co-dissolved in the amphiphilic matrix, which includes lithium-containing salts or compounds in particular. Representative lithium salts include LiCl, $LiNO_3$, Li(salicylate), Li(acetate), Li(propionate), or Li(benzoate), Li(tetraphenylborate) and Li(tetrafluoroborate). Lithium is a preferred component of scintillation mixtures because of the large capture cross-section for thermal neutrons. The neutron capture reaction $^6Li(m,\alpha)^3H$ produces a triton and alpha particle with Q-value of 4.78 MeV. Existing organic-based scintillators possess finite phase compatibility with lithium-containing compounds, which limits the loading ratios to values on the order of 0.15 percent Li by weight. The use of water or polar H-bonding solvents in the scintillation compositions disclosed herein allows for higher lithium loading ratios to be achieved. In one embodiment, greater than one percent Li by weight was achieved by dissolving LiCl in a scintillation mixture comprising TRITON X-100, water, and organic primary/secondary fluors. In another embodiment, greater than one percent Li by weight was achieved by dissolving lithium salicylate in a scintillation mixture comprising TRITON X-100 and water. Lithium-6 enriched compounds may also be used for increased thermal neutron sensitivity, as known in the art.

The technique of pulse-height discrimination may be used to discriminate thermal neutron capture events in Li-loaded scintillators, as known in the art. The composition thus enables simplified neutron spectrometry by combining fast neutron discrimination via PSD, followed by thermalization and subsequent neutron capture on $^6Li$. This results in a secondary pulse that can be differentiated from fast neutron events by the technique of pulse height discrimination as known in the art. Determination of the incident neutron energy is accomplished by measuring the time delay between fast and thermal neutron events in capture-gated coincidence measurements.

Figure 3:
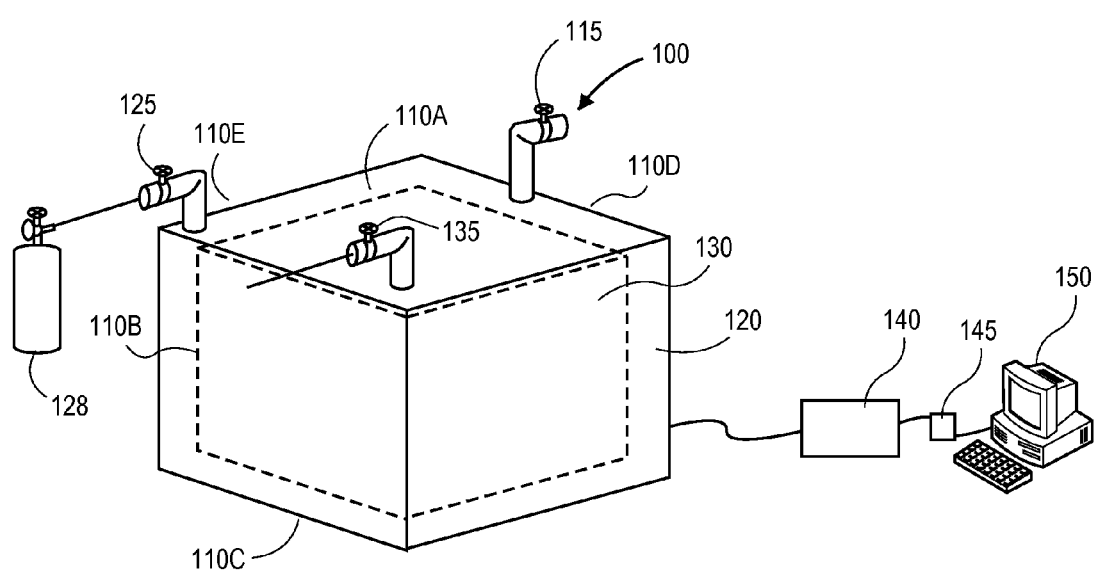
FIG. 3 shows a top side perspective view of an embodiment of a scintillator cell.

A representative scintillation cell is shown in FIG. 3. In this embodiment, cell 100 is a box containing five walls that define a volume for a scintillation composition. Walls 110A, 110B, 110C, 110D and 110E include a reflective surface toward the inside of the box. A representative material for walls 110A, 110B, 110C, 110D and 110E is a material having a reflective surface. Such materials include, but are not limited to white Teflon or $TiO_2$ paint. The walls may form a cell (box) of any dimensions including one having a relatively small volume (e.g., on the order of several milliliters) to one having a relatively large volume (e.g., on the order of hundreds of liters). One representative size is approximately 4"×4"×16", which is the cell size used in several radiation portal monitor designs. Cell 100 can be used in a laboratory setting to, for example, perform neutron and gamma ray detection (e.g., counting) or discrimination (e.g., PSD). Alternatively, cell 100 could be used in screening applications at, for example, ports of entry (e.g., sea ports, airports, border crossings, etc.). Still further, cell 100 may be used in physics-based experiments, such as large underground experiments.

Connected to the five walls to define a contained volume within cell 100 is optical window 120. Optical window 120 is a material such as quartz or optical glass that will allow neutrons or gamma rays to penetrate into cell 100 (into a volume of the box) and allows photons generated in the cell to get out.

Disposed within a volume of cell 100 is a scintillation composition 130. Scintillation composition 130 is a composition such as described above. The components may be introduced into a volume of cell 100 prior to sealing optical window 120 to walls 110A-110E. In another embodiment, cell 100 includes valve 115 providing access to a volume of the cell through wall 110A. In this manner, a scintillation composition may be introduced through valve 115. In one embodiment, scintillation composition is introduced in an amount to fill the volume of cell 100.

In one embodiment, an inert gas is introduced into cell 100 to provide an inert atmosphere for the scintillation composition. In one embodiment, cell 100 includes inlet valve 125 connected to wall 110A and providing access to a volume of cell 100. Inert gas source 128 such as a gas source of argon or nitrogen is connected to inlet valve 135 also connected to wall 110A. In one embodiment, an inert gas from inert gas source 128 is introduced into a volume of cell 100 through inlet valve 125 and any gas in cell 100 (e.g., oxygen-containing gases) is purged through outlet valve 135. In another embodiment, rather than introducing an inert gas into cell 100, a vacuum source may be connected to inlet valve 125 and/or outlet valve 135 to pull a vacuum in cell 100.

Connected to optical window 120 is photodetector 140 (e.g., a photomultiplier tube). Photodetector 140 will detect photons produced within the volume of cell 100 (e.g., photons produced from neutrons and/or gamma rays exposed to scintillation composition 130 through quartz window 120). Photodetector 140 is positioned to receive luminescence generated by scintillating composition 130. Photodetector 140 converts the luminescence to electronic data signals.

In one embodiment, photodetector 140 is connected to analog to digital converter 145 which digitizes the output response to allow it to be analyzed by computer or processor 150. The connection may be through hardwiring or wireless. Computer 150 includes software or machine instructions to receive electronic data signals from photodetector 140 and analyze the data signals. Such instructions include non-transitory machine instructions that, when executed, detect total number of ionizing particles (e.g., neutrons and gamma rays), perform a count of the number of particles detected or, in another embodiment, particle detection (e.g., PSD) between neutrons and gamma rays. One way computer 150 may perform PSD is that the software or machine instructions associated with computer 150 is configured to discriminate between particle types based on the temporal signature of the luminescence generated by the scintillating composition 130.

Figure 4:
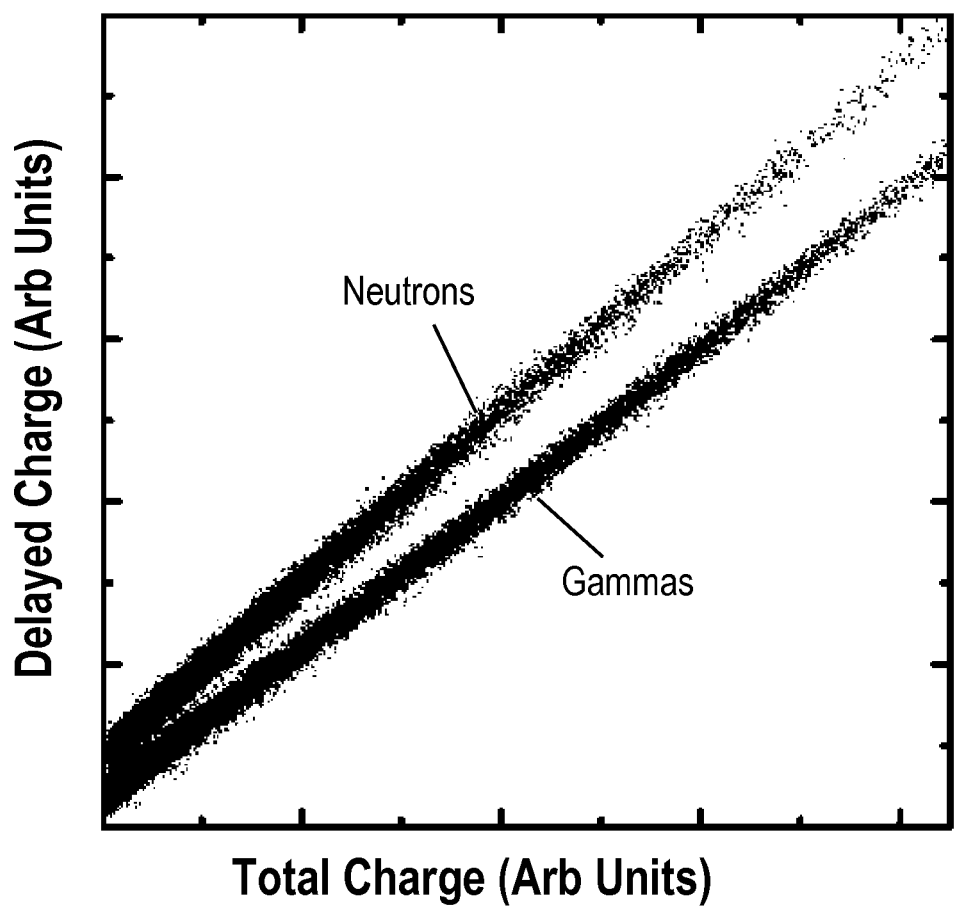
FIG. 4 shows charge comparison PSD results for an amphiphilic liquid scintillation composition.

In one embodiment, cell 100 is exposed to ionizing radiation known to or potentially containing neutrons and/or gamma rays. Neutrons and gamma rays produce scintillation light pulses with different shapes when interacting with organic scintillators. This property is referred to as pulse-shape discrimination (PSD) and is commonly used to distinguish between neutrons and gamma rays in mixed radiation fields. Several methods for PSD have been reported, comprising both analog and digital techniques. A well-known analog technique is referred to as the zero-crossing method, in which double differentiation of the input pulse is performed. A zero crossing discriminator is used in conjunction with a gate delayed anticoincidence pulse to reject gamma rays events while accepting recoil proton events. Advances in computer hardware and digital signal processing (DSP) have enabled this and other types of PSD to be performed digitally. Commonly used DSP methods include zero-crossing, charge-integration, and constant-fraction discrimination. Charge-integration is achieved by simple integration of the pulse current over two different time intervals that are determined by the prompt and delayed decay components of the scintillator. FIG. 4 summarizes the charge-integration results for a representative liquid scintillation composition of the present invention. In this plot, the delayed charge detected between 70-500 ns after the pulse trigger (y-axis) is plotted against the total charge detected in a 500 ns window (x-axis). An AmBe neutron/gamma source was used. A clear separation between neutron and gamma events is evident.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated in the figure to indicate corresponding or analogous elements, which may optionally have similar characteristics.

It should also be appreciated that reference throughout this specification to "one embodiment", "an embodiment", "one or more embodiments", or "different embodiments", for example, means that a particular feature may be included in the practice of the invention. Similarly, it should be appreciated that in the description, various features are sometimes grouped together in a single embodiment, figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

The invention claimed is:

1. A liquid composition capable of producing scintillation response rays comprising:
   an ionic surfactant;
   a nonionic surfactant, the ionic surfactant and the nonionic surfactant being primary solvents in the liquid composition for a luminophore;
   water, the water being a secondary solvent in the liquid composition for the luminophore; and
   the luminophore, wherein the liquid composition exhibits one of mixed micelles or inverse micelles.

2. The composition of claim 1, wherein the nonionic surfactant comprises one or a combination of polyethylene glycol ethers.

3. The composition of claim 2, wherein the polyethylene glycol ether is selected from at least one of the group consisting of polyethylene glycol tert-octylphenyl ether (TRITON X-100) and polyethylene glycol oleyl ether (BRIJ 93).

4. The composition of claim 1, wherein the ionic surfactant comprises a cationic surfactant.

5. The composition of claim 4, wherein the cationic surfactant is selected from at least one of the group consisting of benzalkonium chloride, benzethonium chloride, and cetyltrimethylammonium chloride.

6. The composition of claim 1, wherein the ionic surfactant comprises an anionic surfactant.

7. The composition of claim 6, wherein the anionic surfactant is selected from at least one of the group consisting of lithium, sodium, potassium, ammonium, or alkylammonium salts of dodecylbenzenesulfonate, dodecylsufate, laureth sulfate, and stearate.

8. The composition of claim 1, wherein the at least one luminophore comprises a primary luminophore and a secondary luminophore and the secondary luminophore is present at a concentration of about two percent (w/w).

9. The composition of claim 1, wherein the composition comprises at least one lithium salt.

10. A method comprising:
    combining an ionic surfactant with a nonionic surfactant to form a primary solvent, the primary solvent creates one of micelles or inverse micelles;
    combining at least one luminophore with the primary solvent to form a mixture; and
    combining the mixture with water to form a scintillation composition, wherein combining the ionic surfactant with the nonionic surfactant, combining the at least one luminophore with the primary solvent, and combining the mixture with the water is performed in a scintillation cell under vacuum or an inert atmosphere.

11. The method of claim 10, wherein the nonionic surfactant comprises one or a combination of polyethylene glycol ethers.

12. The method of claim 10, wherein the ionic surfactant comprises a cationic surfactant.

13. The method of claim 10, wherein the ionic surfactant comprises an anionic surfactant.

14. The method of claim 10, wherein the at least one luminophore comprises a primary luminophore and a secondary luminophore.

15. The method of claim 10, further comprising:
subsequent to forming the scintillation composition in the scintillation cell, exposing the scintillation cell to an environment including ionizing radiation.

16. The method of claim 10, wherein the ionizing radiation comprises neutrons and gamma rays, the method further comprising distinguishing between the neutrons and gamma rays using pulse-shape discrimination (PSD).

17. The method of claim 16, further comprising:
adding lithium in the scintillation cell and
extracting energy information via time-correlated thermal neutron capture on lithium using the method of coincidence capture gating.

18. A method for forming a scintillation composition, the method comprising:
combining a primary luminophore and a secondary luminophore with a nonionic glycol surfactant to form a mixture;
subsequent to combining the primary luminophore and the secondary luminophore with the nonionic glycole surfactant, introducing water to the mixture; and
subsequent to introducing the water to the mixture, stirring the mixture to form the scintillation composition.

19. The method of claim 18, wherein the nonionic glycol surfactant is at a concentration range of 40-80% (w/w) of the scintillation solution, the water is at a concentration range of 10-40% (w/w) of the scintillation solution, the primary luminophore is at a concentration range of 10-20% (w/w) of the scintillation solution, and the secondary luminophore is at a concentration range of about 2% (w/w) of the scintillation solution.

20. The method of claim 19, wherein the nonionic glycol surfactant is TRITON X-100, the primary luminophore is selected from a group consisting of p-terphenyl; 2.5-diphenyloxazole; 2-(4-Biphenylyl)-6-phenylbenzoxazole; 9,10-diphenylanthracene; and 1,4-bis[2-(2-methylphenyl)ehtenyl]-benzene, and the secondary luminophore is selected from a group consisting of 1,4-bis(2-methylstyrl)benzene; 1,4-bis(5-phenyloxazol-2-yl)benzene; 2-(4-Biphenylyl)-6-phenylbenzoxazole; 9,10-diphenylanthracene; and 1,4-bis[2-methylphenyl)ehtenyl]-benzene.

* * * * *